United States Patent
Berkovich et al.

(10) Patent No.: US 8,855,363 B2
(45) Date of Patent: Oct. 7, 2014

(54) EFFICIENT METHOD FOR TRACKING PEOPLE

(75) Inventors: Erez Berkovich, Kfar Biyalik (IL); Dror Shapira, Kfar Biyalik (IL)

(73) Assignee: Rafael Advanced Defense Systems Ltd., Haifa (IL)

(*) Notice: Subject to any disclaimer, the term of this patent is extended or adjusted under 35 U.S.C. 154(b) by 258 days.

(21) Appl. No.: 13/258,462

(22) PCT Filed: Mar. 21, 2010

(86) PCT No.: PCT/IB2010/051213
§ 371 (c)(1),
(2), (4) Date: Sep. 22, 2011

(87) PCT Pub. No.: WO2010/116278
PCT Pub. Date: Oct. 14, 2010

(65) Prior Publication Data
US 2012/0014562 A1    Jan. 19, 2012

(30) Foreign Application Priority Data
Apr. 5, 2009 (IL) .......................... 197996

(51) Int. Cl.
G06K 9/00 (2006.01)
(52) U.S. Cl.
CPC ........ *G06K 9/00228* (2013.01); *G06K 9/00771* (2013.01)
USPC ........... 382/103; 382/190; 382/195; 382/209; 382/224
(58) Field of Classification Search
USPC .......................................... 382/103, 118, 190
See application file for complete search history.

(56) References Cited

U.S. PATENT DOCUMENTS

| | | | | |
|---|---|---|---|---|
| 5,627,586 A | * | 5/1997 | Yamasaki | 348/169 |
| 5,802,220 A | * | 9/1998 | Black et al. | 382/276 |
| 6,188,777 B1 | * | 2/2001 | Darrell et al. | 382/103 |
| 6,404,900 B1 | | 6/2002 | Qian et al. | |
| 6,445,810 B2 | * | 9/2002 | Darrell et al. | 382/115 |

(Continued)

FOREIGN PATENT DOCUMENTS

| | | | | |
|---|---|---|---|---|
| EP | 1688760 A1 | * | 8/2006 | G01S 11/12 |
| WO | WO 2010073171 A2 | * | 7/2010 | |
| WO | WO 2010073172 A2 | * | 7/2010 | |
| WO | WO 2010116278 A1 | * | 10/2010 | |

OTHER PUBLICATIONS

Jebara, T.S et al, "parameterized structure from motion for 3d adaptive feedback tracking of faces", in computer vision and pattern recognition, 1997, pp. 1-8.

*Primary Examiner* — Chan Park
*Assistant Examiner* — Iman K Kholdebarin
(74) *Attorney, Agent, or Firm* — Mark M. Friedman

(57) ABSTRACT

In accordance with one embodiment, a method to track persons includes generating a first and second set of facial coefficient vectors by: (i) providing a first and second image containing a plurality of persons; (ii) locating faces of persons in each image; and (iii) generating a facial coefficient vector for each face by extracting from the images coefficients sufficient to locally identify each face, then tracking the persons within the images, the tracking including comparing the first set of facial coefficient vectors to the second set of facial coefficient vectors to determine for each person in the first image if there is a corresponding person in the second image. Optically the method includes using estimated locations in combination with the vector distance between facial coefficient vectors to track persons.

28 Claims, 5 Drawing Sheets

(56) References Cited

U.S. PATENT DOCUMENTS

| | | | |
|---|---|---|---|
| 6,507,366 B1* | 1/2003 | Lee | 348/352 |
| 6,529,613 B1* | 3/2003 | Astle | 382/103 |
| 6,658,136 B1 | 12/2003 | Brumitt | |
| 6,757,571 B1* | 6/2004 | Toyama | 700/47 |
| 7,139,411 B2* | 11/2006 | Fujimura et al. | 382/103 |
| 7,233,546 B2* | 6/2007 | Berkovich et al. | 367/128 |
| 7,317,812 B1 | 1/2008 | Krahnstoever et al. | |
| 7,551,755 B1* | 6/2009 | Steinberg et al. | 382/118 |
| 7,653,213 B2* | 1/2010 | Longhurst et al. | 382/103 |
| 7,660,437 B2* | 2/2010 | Breed | 382/104 |
| 7,693,310 B2* | 4/2010 | Kato et al. | 382/118 |
| 8,180,104 B2* | 5/2012 | Sonoura | 382/103 |
| 8,229,163 B2* | 7/2012 | Coleman et al. | 382/103 |
| 8,253,564 B2* | 8/2012 | Lee et al. | 340/541 |
| 2001/0000025 A1* | 3/2001 | Darrell et al. | 382/103 |
| 2003/0052971 A1 | 3/2003 | Gutta et al. | |
| 2004/0136574 A1 | 7/2004 | Kozakaya et al. | |
| 2004/0146183 A1* | 7/2004 | Shimoni | 382/103 |
| 2004/0263625 A1 | 12/2004 | Ishigami et al. | |
| 2005/0147292 A1 | 7/2005 | Huang et al. | |
| 2006/0018516 A1* | 1/2006 | Masoud et al. | 382/115 |
| 2006/0093185 A1* | 5/2006 | Kato et al. | 382/103 |
| 2006/0165293 A1 | 7/2006 | Hamanaka | |
| 2006/0177097 A1* | 8/2006 | Fujimura et al. | 382/103 |
| 2008/0273751 A1 | 11/2008 | Yuan et al. | |
| 2009/0060276 A1* | 3/2009 | Yu et al. | 382/103 |
| 2009/0087029 A1* | 4/2009 | Coleman et al. | 382/103 |
| 2010/0207762 A1* | 8/2010 | Lee et al. | 340/541 |
| 2011/0116682 A1* | 5/2011 | Wang et al. | 382/103 |
| 2011/0255746 A1* | 10/2011 | Berkovich et al. | 382/103 |
| 2011/0273620 A1* | 11/2011 | Berkovich et al. | 348/584 |
| 2012/0014562 A1* | 1/2012 | Berkovich et al. | 382/103 |
| 2012/0163657 A1* | 6/2012 | Shellshear | 382/103 |
| 2013/0070973 A1* | 3/2013 | Saito et al. | 382/118 |
| 2013/0208948 A1* | 8/2013 | Berkovich et al. | 382/103 |

* cited by examiner

EFFICIENT METHOD FOR TRACKING PEOPLE

FIELD OF THE INVENTION

The present embodiment generally relates to the field of image processing and computer vision, and in particular, it concerns an efficient method for tracking people.

BACKGROUND OF THE INVENTION

Tracking people in a real scene is an important application in the field of computer vision. Tracking techniques are used in many areas, including security, monitoring, research, and analysis. One method of tracking people is to track the head or face of the person. The location of the face of a person correlates to the location of the person, so tracking the face of a person allows us to know where the person is in a scene.

In order to be able to track the face of the person, we need to be able to locate a face in an image of a real scene. A variety of techniques is known in the field of computer vision for locating objects, and more specifically for locating faces. These techniques each have advantages and limitations, as well as varying processing requirements.

An area of computer vision and artificial intelligence that involves processing facial images is generally referred to as identification. To perform identification, a face of interest is compared to a database of known faces to determine a one-to-one match. The field of identification has a large body of research and many techniques are known in the field for performing identification. Typically, identification involves deriving or generating a large number of coefficients or features for each face, and then comparing these coefficients or features for each face to insure success in the identification. Identification techniques require a relatively large amount of computational power, good resolution, and a database of known faces. An application of identification is the use of facial recognition to match an unknown person to a database of known persons to determine who the unknown person might be.

One of the common techniques for tracking is referred to as feature matching. Feature matching looks for features of an object in a two-dimensional image and correlates these features in subsequent images to develop tracks corresponding to the motion of the object relative to the camera. The technique requires a relatively small amount of computational power. Applications of feature matching include tracking a moving object after it has been designated as an object of interest.

The problem of tracking has been addressed using a variety of techniques. A summary of tracking techniques is referenced by Richard J. Qian, ET. Al. in U.S. Pat. No. 6,404,900, Method for robust human face tracking in presence of multiple persons. In this patent, Qian teaches a method for outputting the location and size of tracked faces in an image. This method includes taking a frame from a color video sequence and filtering the image based on a projection histogram and estimating the locations and sizes of faces in the filtered image.

In the paper *Parameterized structure from motion for 3D adaptive feedback tracking of faces*, by Jebara, T. S., ET. Al. in Computer Vision and Pattern Recognition, 1997 a real-time system is described for automatically detecting, modeling and tracking faces in three dimensions. A combination of two-dimensional and three-dimensional techniques is used with a Kalman filter to predict the trajectory of the facial features and constrain the search space for the next frame in the video sequence.

U.S. Pat. No. 7,317,812 to Nils Krahnstoever, ET. Al. Method and Apparatus for Robustly Tracking Objects (Nils '812) includes background on many techniques for implementing video tracking systems. Nils '812 teaches a video image based tracking system that allows a computer to robustly locate and track an object in three dimensions within the viewing area of two or more cameras. The preferred embodiment of this invention tracks a person's appendages in three dimensions allowing touch free control of interactive devices.

U.S. Pat. No. 665,816 to Barrett L. Brumitt, System and process for locating and tracking a person or object in a scene using a series of range images, teaches a system and method for tracking people and non-stationary objects of interest in a scene using a series of range images of the scene taken over time. Range information is used to compute a background model that is subtracted from subsequent images to produce a foreground image. The foreground image is then segmented into regions of interest.

The methods of tracking people in the previous art fall into several categories. One category is methods that involve extracting the image of a person from an image in a series of images, predicting the location of the person in a subsequent image, and then processing the subsequent image with this knowledge to increase the success of tracking the object. This method involves significant processing of each person in each image.

Another conventional method involves using multiple cameras to provide images from different viewing angles. This method involves processing at least two images for each moment in time.

The application of tracking people based on their faces highlights the need for an efficient method for tracking people. The use of conventional techniques for feature matching is insufficient because all faces have the same general features. There is not enough information to distinguish one person from another in a given image. Using techniques of identification would require the resources of a relatively large amount of computer power, as well as good resolution and a database of known objects. These identification resources are not necessary to distinguish one person from another in a given image.

The methods of previous inventions involve significant quantities of data, complex processing, and/or multiple system resources to track objects. The current invention provides a method and system for improving tracking performance of multiple people using an efficient coefficient template, combined with other techniques for increased success tracking people of interest in a variety of environments.

SUMMARY

In accordance with one embodiment, a method to track persons includes generating a first and second set of facial coefficient vectors by: (i) providing a first and second image containing a plurality of persons; (ii) locating faces of persons in each image; and (iii) generating a facial coefficient vector for each face by extracting from the images coefficients sufficient to locally identify each face, then tracking the persons within the images, the tracking including comparing the first set of facial coefficient vectors to the second set of facial coefficient vectors to determine for each person in the first image if there is a corresponding person in the second image.

In an optional embodiment, the method further includes (a) generating a third set of facial coefficient vectors by: (i) providing a third image containing a plurality of persons; (ii) locating persons in the third image; (iii) locating faces of persons in the third image; and (iv) generating a facial coefficient vector for each face by extracting from the third image coefficients sufficient to locally identify each face, then (b) determining estimated locations in the third image of each person from the location of each person for which a first facial coefficient vector was extracted with the location of each person for which second facial coefficient vector was extracted; (c) determining the vector distance between each second facial coefficient vector and each third facial coefficient vector; and (d) tracking the persons within the images, the tracking including using the estimated locations in combination with the vector distance between facial coefficient vectors to determine for each face in the second image which is the corresponding face in the third image.

In accordance with one embodiment, a system to track persons includes (a) at least one image capture device providing a first image; (b) at least one image capture device providing a second image; and (c) a processing system including at least one processor, operationally connected to the image capture device, configured to: (i) generate from the first image a first set of facial coefficient vectors; (ii) generate from the second image a second set of facial coefficient vectors; and (iii) track persons using the first set of facial coefficient vectors with the second set of facial coefficient vectors.

In an optional embodiment the processing system is further configured to: (a) generate a third set of facial coefficient vectors; (b) determine estimated locations in the third image of each person from the location of each person for which a first facial coefficient vector was extracted with the location of each person for which second facial coefficient vector was extracted; (c) determine the vector distance between each second facial coefficient vector and each third facial coefficient vector; and (d) track the persons within the images, the tracking including using the estimated locations in combination with the vector distance between facial coefficient vectors to determine for each face in the second image which is the corresponding face in the third image.

In an optional embodiment, the number of coefficients in the facial coefficient vectors is in the range of 5 to 200 coefficients. In another optional embodiment, the size of the face in the image is used to derive the three-dimensional position of the corresponding person. Another optional embodiment includes determining a location of static objects, wherein the location of the static objects is used to facilitate the tracking. In another optional embodiment, the first image is from a first image capture device and the second image is from a second image capture device. In another optional embodiment, in a case in which a first facial coefficient template in the first image does not correspond to any facial coefficient template for a face in the second image, the first facial coefficient template is retained for use in the comparing while the tracking is repeated for subsequent images. In another optional embodiment, the provided image derives from a plurality of images that have been processed to generate the provided image. In another optional embodiment, the images are provided from a storage system. In another optional embodiment, the location is a two-dimensional location. In another optional embodiment, the location is a three-dimensional position. In another optional embodiment, the tracking includes comparing the two-dimensional locations of the bodies of persons in the images. In another optional embodiment, the tracking includes comparing the three-dimensional positions of the bodies of persons in the images. In another optional embodiment, the tracking includes color matching of persons in the images. In another optional embodiment, the tracking includes texture matching of persons in the images.

In another optional embodiment, the tracking includes any method of matching persons in the images.

BRIEF DESCRIPTION OF FIGURES

The embodiment is herein described, by way of example only, with reference to the accompanying drawings, wherein.

DEFINITIONS

Vector is an array of ordered data.

Coefficient vector is a set of numbers that correspondingly describes features of a type of object.

Facial coefficient vector is a set of numbers that correspondingly describes features of a face.

Vector distance is a measure of the "difference" or mismatch between two vectors, as defined by any suitable mathematical expression or other measure of the mismatch between the values of the coefficients of the two vectors. The vector distance itself may be a vector or scalar parameter. Most preferably, the measure of mismatch is chosen such that its value is directly helpful in evaluating the probability, or the relative probability, that the coefficients of two vectors are representative of the same object.

Biometric distance is the vector distance between two vectors, where each vector describes the features of a living object, in this case referring to the multi-dimensional features of the face of a person. A larger biometric distance correlates to a smaller biometric similarity between two faces.

Spatial distance is the difference in physical location of an object at different times.

Tracking identifier is a locally unique identification, such as a number, which is assigned to information to facilitate the reference, access, and use of the information.

Location is a two-dimensional reference, for example the location of an object in an image.

Position is a three-dimensional reference to an object in space, for example the position of a person in a real scene.

DETAILED DESCRIPTION

The principles and operation of this method according to the present embodiment may be better understood with reference to the drawings and the accompanying description. The current invention describes a method and system for efficiently tracking people. In these embodiments, the images can be provided from a single image capture device or a plurality of image capture devices. In this description, the location and tracking of the face of a person facilitates the tracking of that person.

A first embodiment of this method begins with the providing of an image. This image is of a real scene including a plurality of people. An example of providing an image is a frame from an image capture device such as a video camera.

The video camera provides a series of images of a real scene. Some of the people in this scene are moving and other people are static. The series of images is processed to track the people and each of these people is given a tracking identifier. Later, a person from the scene may be of particular interest. A user of the system can select a person of interest and the system can provide the user with the location information corresponding to the person that was tracked.

Figure 1:
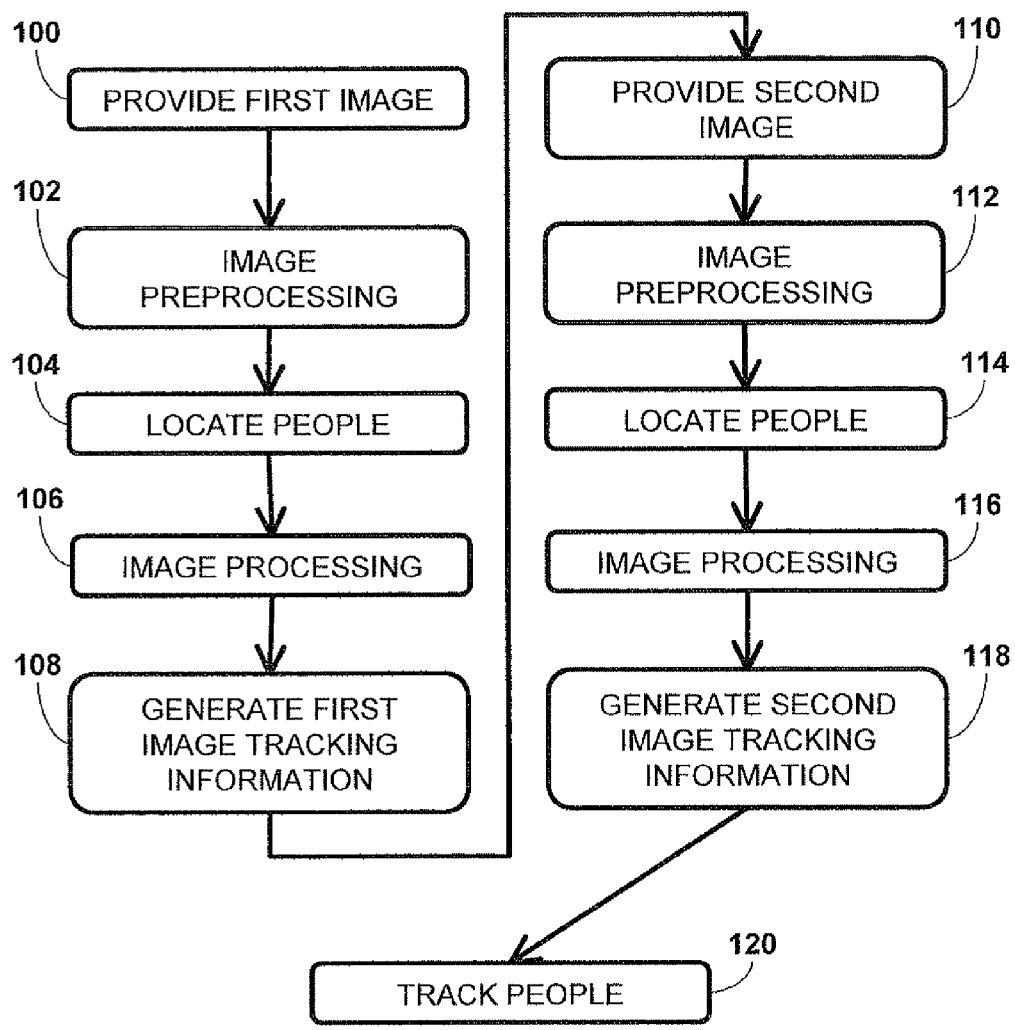
FIG. 1 is a flowchart of a method to track people.

Referring now to the drawings, FIG. 1 is a flowchart of a method to track people. The method begins by providing at least one first image, shown in block 100. This image may be from a variety of sources. An example is a security camera that captures a series of images of a real scene. One image from this series is provided to start the steps of this method. The type of image depends on the image capture device used to implement the system of this method, and is further described in reference to FIG. 5.

The first image may optionally be preprocessed, shown in block 102. Another option is to input two or more images and co-process the images in the preprocessing block 102. Pre-processing includes any processing necessary to convert the provided image into the appropriate input for subsequent processing. An example of pre-processing is to change the data format of the provided image to a data format that can be read by the next step in the method. After any optional pre-processing, shown in block 102 is performed, people are located in the first image, shown in block 104. A real scene may at times not have any people, and at other times have many people. Techniques for locating people in an image are known in the industry. Techniques include finding the area in the image of: faces and human bodies based on form, color, or texture. When an area of interest is located in the image, the coordinates of the area and a bounding box surrounding it can be determined. An example of coordinates is an (x, y) pair designating the two-dimensional location of a face in a two-dimensional image. If the image is three-dimensional, the area of interest will be the three-dimensional position.

The areas of interest found in the image may optionally be processed, shown in block 106. Processing includes any processing necessary to prepare the area of interest in the image for subsequent processing. An example of processing is the need for normalization of faces in a captured image in preparation for facial processing. The size of the faces in the captured image is different depending on the distance of the person from the image capture device. As people in the scene move, their distances from the image capture device will change, resulting in a change in the size and pose of their faces in the captured image. It is desirable to normalize the size of the faces to facilitate facial processing. Techniques for performing normalization are known in the industry and taught in the patent World Intellectual Property Organization, International Publication Number WO 2006/109291 A1, Face Normalization for Recognition and Enrollment to Rafael-Armament Development Authority Ltd.

For each area of interest that has been located in the first image, tracking information is generated, shown in block 108. Different tracking techniques will generate different information. In one implementation, for each face that has been located in the first image, a facial coefficient vector is generated in block 108. The use of a facial coefficient vector in this invention provides an efficient method for tracking people. Identification of a face is possible as an optional feature of this method, however the efficiency of the method is facilitated by only extracting features sufficient to distinguish the faces in the scene from each other, which is faster and requires less computational resources than performing facial identification.

The technique of feature matching can assist in locating the face of a person in an image, but it does not provide sufficient detail to distinguish one person from another. As described in the background of this document, facial identification determines a one-to-one match, or in other words, tries to identify uniquely a face with respect to all other known faces. This identification can be called a unique identification, or a universal uniqueness. For the purpose of tracking, it is not necessary to identify uniquely a face. Tracking a face needs sufficient information to match a face to the same face in subsequent images, or in other words, to locally identify a face with other faces in the provided images. This provides local identification, or a local uniqueness. An example of local identification can be seen in a situation where it is desired to track persons in the lobby of an airport. The airport may serve several million people in the surrounding area. At times, there may be dozens to hundreds of persons in the airport lobby. In an image of the scene of the lobby, each person is identified. For each person identified, it is not necessary to identify which of the several million people this specific person might be. It is only necessary to identify the person sufficiently to distinguish him from the other persons in the image. In a subsequent image, each person is again identified sufficiently to distinguish him from the dozens or hundreds of other people in the scene. This local identification may not contain sufficient information to identify who a specific person is, but it does contain sufficient information to enable tracking of the person from one image to a subsequent image.

A typical example of facial recognition uses a facial image that is 100 pixels by 100 pixels in size, requiring processing of 10,000 data points for each facial image. For unique identification, it is necessary to retain a large amount of information derived from the original facial image. For local identification, as in our case of tracking, it is not necessary to retain all of the information derived from the original facial image. It is sufficient to extract the multi-dimensional features that distinguish one person from another person locally. Known techniques, such as described in the above referenced patent WO 2006/109291, can be used to normalize the facial image and perform extraction of facial features by processing the normalized facial image with an eigenface to generate a small number of coefficients. Experimental results show that this small number of coefficients can be between 5 and 200 coefficients for successful local identification. In a preferred embodiment, the number of coefficients is in the range of 10 to 50 coefficients. This small number of coefficients is referred to as a facial coefficient vector. Each coefficient in the vector represents a facial feature. The facial coefficient vector includes sufficient features to distinguish one person from another locally. The reduction in data on the order of 10,000 to 50 results in faster processing of each face and requires less computational resources. In general, the smaller the number of coefficients in the vector, the less computation necessary to correlate the vectors resulting in more efficient and faster tracking of people. At the same time, there must be sufficient coefficients to distinguish one person from another locally.

After the first image has been processed and a first set of tracking information has been generated, a second image is processed according the above described method, and a second set of tracking information is generated, as shown in blocks 110, 112, 114, 116, and 118. Referring to FIG. 1, tracking people is shown in block 120. In one implementation, the first set of tracking information provides a first set of facial coefficient vectors and the second set of tracking information provides a second set of facial coefficient vectors. Each facial coefficient vector in the first set of facial coefficient vectors is compared to the facial coefficient vectors in the second set of facial coefficient vectors. The difference between two vectors can be calculated and is referred to as the vector distance. The vector distance may be derived from any suitable mathematical expression or other measure of the mismatch between the values of the coefficients of vectors. In the case of facial coefficient vectors, the vector distance between two facial coefficient vectors represents the difference between the facial features described by the vectors, and is referred to as the biometric distance. The biometric distance can be used as an indication of how different two images of people are, or alternatively how similar two images of people are. In an example where the captured images are of two different people, the facial features will generally be different, resulting in different coefficients for the facial coefficient vector, and a large biometric distance between the two people. In an example where the captured images are of the same person, the facial features will generally be the same or similar, resulting in the same or close coefficients for the facial coefficient vector, and a small biometric distance between the two facial coefficient vectors. A larger biometric distance correlates to a smaller biometric similarity between two faces.

When the biometric distance between two facial coefficient vectors is below a given threshold, the vectors are considered a match, and the location of the face in the first image can be tracked to the location of the face in the second image. The given threshold is dependent on the implementation of the method. The threshold can be determined in a variety of ways, including: being set manually by a user of the system, determined by the system through training prior to operation, using machine-learning algorithms during operation of the system or other methods that are known in the art. This method is then repeated on subsequent vectors and images to continue locating each face as it moves in the scene.

Note that in this method, when a second image is provided, the order is non-restricting as to generating the facial coefficient vectors for each person in the second image and comparing a facial coefficient vector from the second image to the first set of facial coefficient vectors. For example, one implementation starts by extracting from the second image a first facial coefficient vector, then comparing this first facial coefficient vector to the set of facial coefficient vector from the first image. After doing this comparison, a second facial coefficient vector can be extracted from the second image and compared to the set of facial coefficient vectors from the first image.

The subsequent images used in this method are not limited to being adjacent images. An example of using subsequent images that are not adjacent to each other is using periodic images from a video sequence. A typical video sequence can provide 30 images each second. An implementation of this method can use one image every half-second, or every $15^{th}$ image. Another example occurs when a face is not tracked between a first image and a second image, but is tracked between a first image and a third or subsequent image. This example can occur when a face being tracked is obscured, or the person leaves the scene and then returns to the scene.

In an optional embodiment, the biometric distance is used in combination with conventional tracking techniques to provide increased success in tracking. Using biometric distances provides one type of comparison between persons to facilitate tracking. In one embodiment, a second type of comparison is to predict the location of a person in a subsequent frame, then compare the predicted location of the person to the locations of detected persons. The difference in the locations between two people is referred to as spatial distance.

Figure 2:
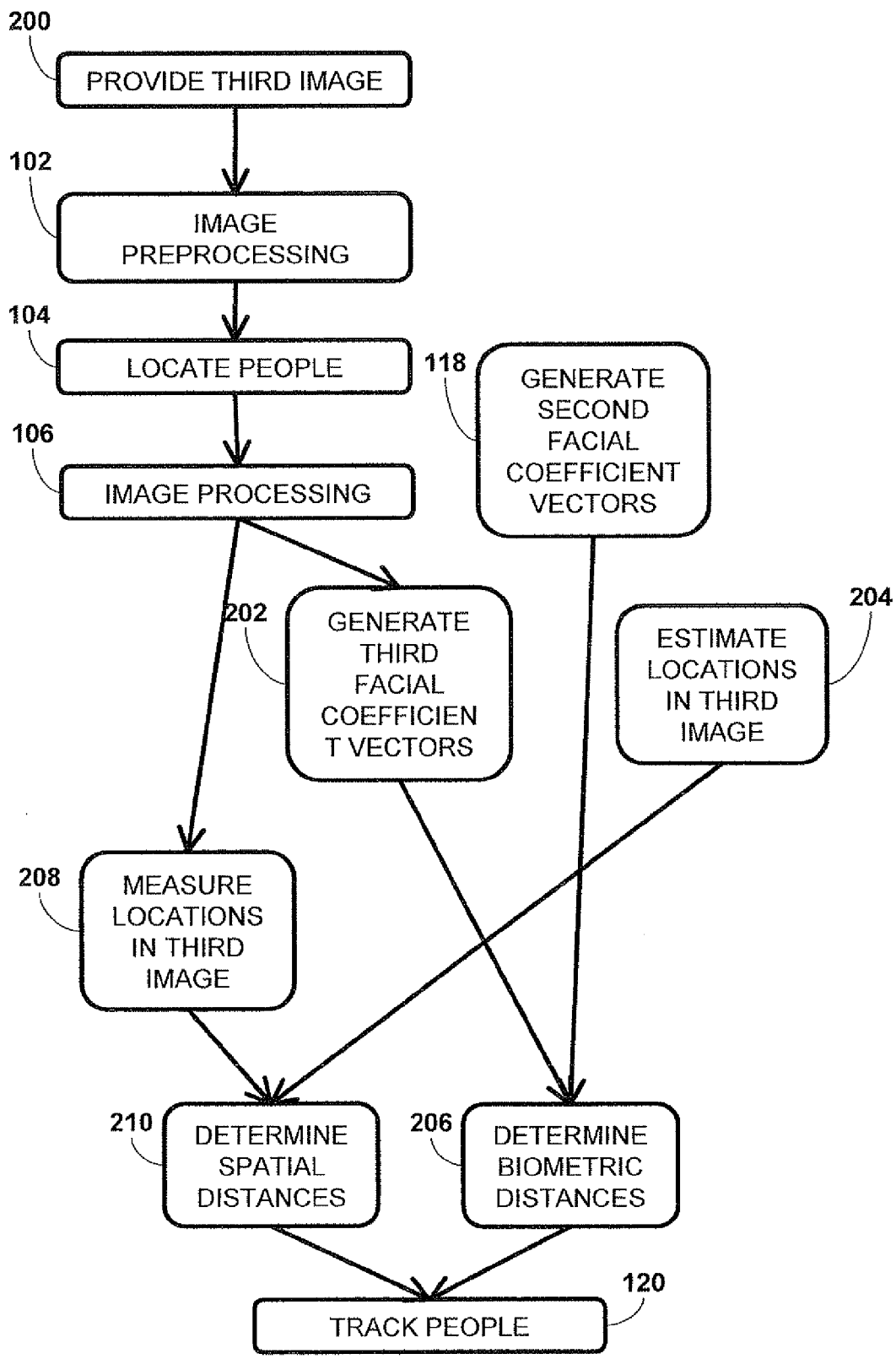
FIG. 2 is a flowchart of a method to track people using both biometric and spatial techniques.

Referring to FIG. 2, flowchart of a method to track people using both biometric and spatial techniques, given a sequence of images, a set of facial coefficient vectors is generated for each image 118, 202. Spatial locations are also generated for each image, shown in blocks 204, 208. Two comparisons are done. In the first comparison, shown in block 206, the biometric distance is determined between each facial coefficient vector in a second image in the sequence and each facial coefficient vector in a third image in the sequence. In a second comparison, the known location of persons in the first image can be used with the known location of the corresponding persons in the second image to predict the location of the persons in the third image, shown in block 204. The second comparison uses the predicted locations of persons in the third image, shown in block 204, in combination with the locations of detected persons in the third image, shown in block 208, to determine the spatial distances between the predicted locations of the persons and each detected persons. The spatial information can be fed back into the method for use in subsequent tracking. Spatial estimation can be implemented with techniques such as Kalman filtering, particle filtering, or other techniques known in the art.

With the results from these two comparisons, a third comparison can be done using a combination of biometric distance and predicted spatial distance. This third comparison is for the purpose of tracking people, shown in block 120. One technique for implementing the third comparison is to use an approach known as supervised learning. In supervised learning, a sample group of values is collected according to a given set of parameters (features) for the same faces. Another similar sample group is collected according to the same given set of parameters for different faces. These collections are generally guided by a human operator, preferably aided by an interactive display, and is therefore termed manual labeling. A classification algorithm is then applied to the samples to optimally divide the space of all possible values into two subspaces that correspond to samples from each group. Classification algorithms such as Maximum Likelihood or Support Vector Machine are known in the art. Depending on the number of parameters considered, and therefore on the number of dimensions of the values space, there is thus defined a division. In the case of one dimension, for example using biometric distance alone, the division is a line. In the case of two dimensions, for example using biometric distance and spatial distance, the division is a curve. In the case of three dimensions, for example using biometric distance, spatial distance, and object dynamics, the division is a surface.

In an alternate embodiment, facial coefficient vector tracking is used in combination with conventional techniques. In an alternate embodiment, facial coefficient vector tracking is used in combination with texture tracking. In an alternate embodiment facial coefficient vector tracking is used in combination with both predicated spatial tracking and texture tracking. Conventional tracking techniques include spatial tracking in two-dimensions, spatial tracking in three-dimensions, spatial tracking with dynamics, color matching, and texture matching. Other techniques are known in the art and other combinations will be obvious to one skilled in the art.

In the case where the face of a person is not visible, conventional techniques can be used to track the person. When a face becomes visible, the technique of facial coefficient vector tracking can be added to the conventional techniques for increased success in tracking. Alternatively, if facial coefficient vector tracking is being used to track a person, and the face is no longer visible, conventional techniques can be used to continue to track the person.

In the case where the system loses track of a person, the tracking information for that person is retained by the system for use in subsequent images. An example is a person being tracked and the person leaves the scene, or is not visible due to another object in the scene. The system retains the tracking information for that person, such as the facial coefficient vector, and continues to track other persons in the scene. In subsequent images, the system can attempt to reacquire the person by comparing the retained tracking information with tracking information for the subsequent images. Tracking information is retained for a given length of time that is determined by the system implementation and computational realities.

An implementation of the method of using a combination of comparisons is providing only two images. The two images are each processed to generate tracking information, for example, a set of facial coefficient vectors and a set of spatial location coordinates for each image. The set of facial coefficient vectors from the first image is used with the set of facial coefficient vectors from the second image to generate a set of biometric distances. The set of spatial location coordinates from the first image is used with the set of spatial location coordinates from the second image to generate a set of spatial distances. Then the biometric distances and the spatial distances are used to perform a combined comparison and track the persons from the first image to the second image.

Figure 3:
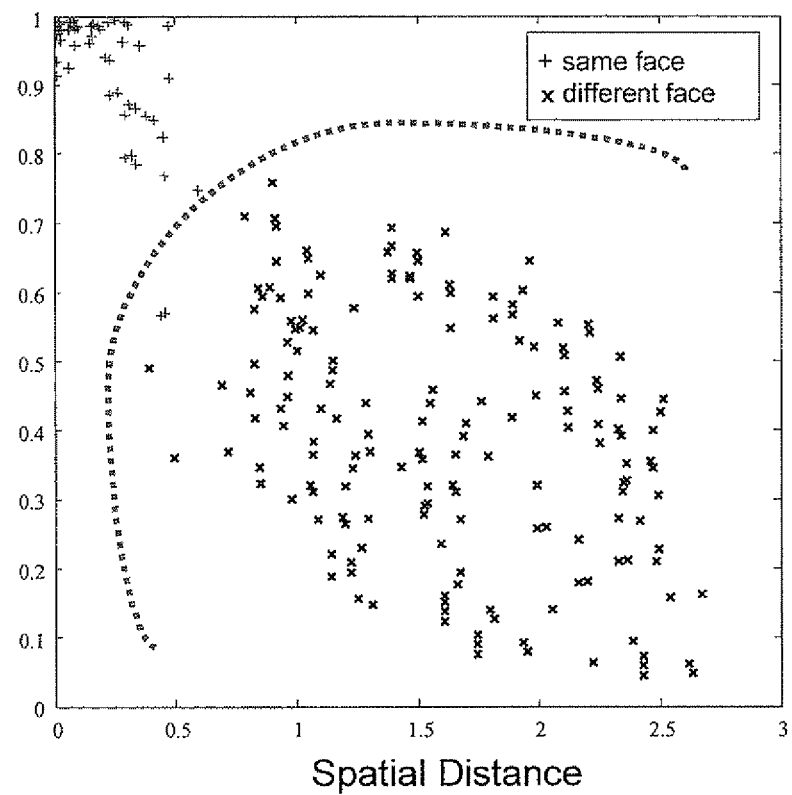
FIG. 3 is a schematic example of a two-dimensional division using biometric distance and spatial distance as the parameters.

FIG. 3 is a schematic example of a two-dimensional division using biometric similarity and spatial distance as the parameters. In FIG. 3, a group of samples of the distances between subsequent detections of same faces and a group of samples of the distances between subsequent detections of different faces are mapped. The curve is the calculated division between the "same" and "different" subspaces of the biometric-spatial space. A practical implementation of such a map with a curve as a division can be done with a lookup table. Using a lookup table, face detections can be classified according to the subspace into which their values are mapped, and the tracking model is defined accordingly.

An alternative technique for implementing the third comparison is to use an approach known as unsupervised learning. In unsupervised learning, a large sample group of values is collected according to a given set of parameters (features) for faces. The collection is done without any prior labeling and can therefore be performed by a processing system without the need for a human operator. A clustering algorithm is then applied to the sample group. Sampling algorithms are known in the art, such as the k-means clustering algorithm, which divides the samples into two groups that map into respective separate and distinct regions in the space of the relevant feature parameters. Subsequently the algorithm divides the entire feature parameters space into two subspaces. Generally, this division is done in a manner similar to the dividing done in the supervised learning technique. The division between the sample groups is then defined accordingly. Using these techniques each face in the second image can be tracked to a face in the third image.

Figure 4A:
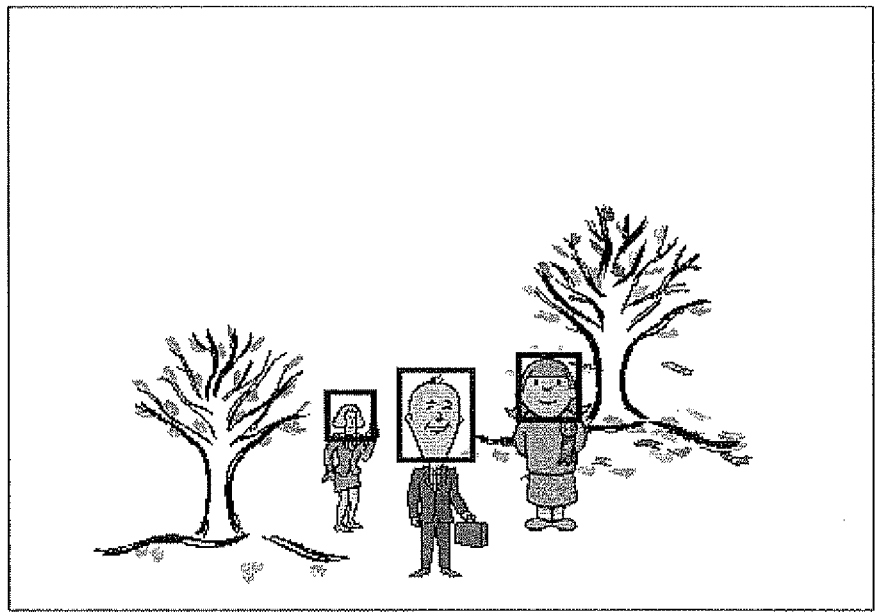
FIG. 4A is an illustration of a two-dimensional image containing several people.
Figure 4B:
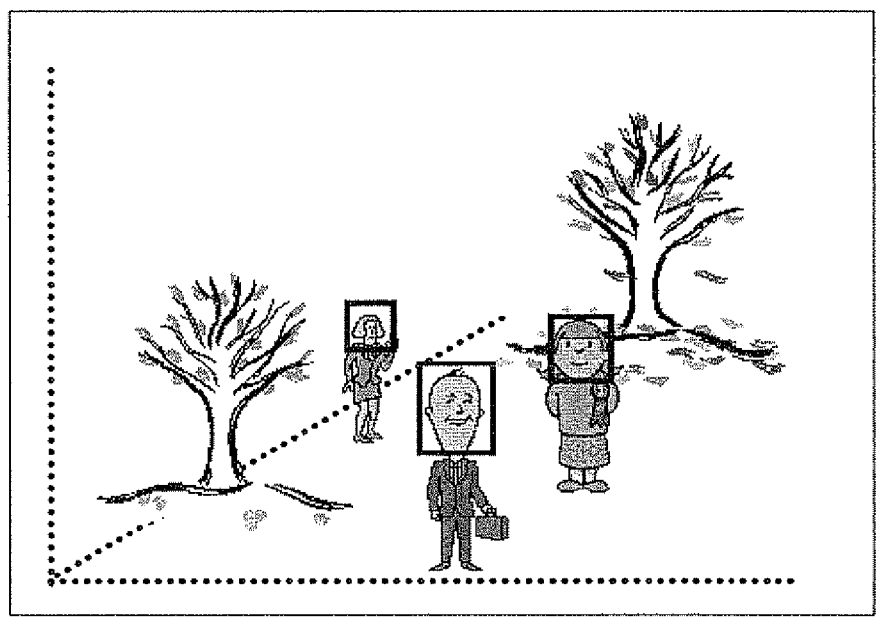
FIG. 4B is an illustration of a two-dimensional image containing several people, showing the location of the face and the size of the face can be used to derive the position of the face in three-dimensions.

In an optional embodiment, the size of the face in the image is used to derive the three-dimensional position of the corresponding person in the image and this information is used to provide increased success in tracking. Referring to FIG. 4A, an illustration of a two-dimensional image containing several people, the faces of the people in the image can be found. Techniques for locating faces in an image are known in the industry. Then the size of each face can be measured. Referring to FIG. 4B is an illustration of a two-dimensional image containing several people, showing the location of the face and the size of the face can be used to derive the position of the face in three-dimensions. This position information can be used to derive the current position of the person. Position information from previous images can be used with current position information to predict the position of a face in a subsequent image. Position information can be used by a variety of algorithms to assist in tracking a face. An optional use of the position information is to determine when one person is in front of another person, or if the person moves behind another object in the scene.

The steps of the method of FIG. 2 can be used with the optional embodiment of position information. In block 204 instead of only estimating the two-dimensional locations of the persons, optionally the step can include estimating the three-dimensional positions of the persons. Similarly, in block 208 instead of only measuring the two-dimensional locations of the persons, optionally the step can include deriving the three-dimensional positions of the persons. This position information is then used by block 210 to determine the spatial distances, in three-dimensions, between the persons. The spatial distance between positions can be used with the biometric distances, determined in block 206, to facilitate tracking of people, shown in block 120.

In an optional embodiment, the location of static objects is used to facilitate tracking. Referring to FIG. 4A, there is a variety of objects in a provided image. Some objects in the image are of interest, for example, the moving people (also termed "foreground"), and some objects are not of interest. Objects that are not of interest include, for example, trees, signposts, walls, and buildings. A series of images can be evaluated periodically to determine which portions have changed. The evaluation does not have to be on every image. The specific application of the method and environment in which it is implemented will determine how often an image will need to be evaluated. The change between one image and a subsequent image can be measured. Some movement is expected due to the realities of implementation, and includes for example tree branches blowing from the wind and the image capture device shaking from passing traffic. A threshold can be used to determine which portions of the images are moving, and which portions can be considered not significantly moving. These non-moving portions are referred to static information (also known in the art as "background" or "background model").

Referring to FIG. 1, the identification of static information can be implemented in the image-preprocessing step, shown in blocks 102, 112, or the image-processing step, shown in blocks 106, 116. This information can then be fed back into the method for use in image preprocessing, blocks 102, 112, or image processing, blocks 106, 116. The specific implementation will depend on the application of this method, and options will be obvious to one skilled in the art. Varieties of techniques exist to identify static information in a given image. One technique is to identify pixels that do not change. Other techniques are known in the art.

This static information can be used to assist in the tracking of persons in an image. One example for use of this optional technique is to assist the image preprocessing, shown in blocks 102, 112, such that the static portions of the image do not have to be processed. This results in less time required and/or less computational resources needed to process the image. Another example is using the information about the location of static objects in an image with the location of a person when the person can no longer be tracked. If a person is tracked to the same location as a static object, it is possible that the person moved behind the static object. This last known location of a person can be used in subsequent images for re-acquiring the person on a side of the static object and continuing the tracking of the person. A specific example is the case where a person walks behind a static object such as a tree, or in other words, there is a tree between the image capture device and the person. The person is tracked to the same location as the tree and in subsequent frames, the image can be processed to look for the person on the other side of the tree. Another specific example is the case where a person walks behind a static object such as a telephone booth. The person is tracked to the same location as the telephone booth, and in subsequent frames, the image can be processed to look for the person on one of the sides of the telephone booth. The person may be found on either/any side of the static object.

In an optional embodiment, the first image is from a first image capture device and the second image is from a second image capture device. Referring to FIG. 1, a first image is provided in block 100 and a second image is provided in block 110. These images can be from a variety of sources, including the same source or different sources. For example, the first image can be provided by a first image capture device and the second image can be provided by a second image capture device. Another example is to provide two or more images in block 100 and co-process the images in the preprocessing block 102. The implementation of the image preprocessing, blocks 102, 112, and image processing, blocks 106, 116 will depend on the specific application of this method, and the implementation of one or more image capture devices to provide images for this method.

Another example of this optional embodiment is tracking a person from the viewing area of one image capture device to the viewing area of another image capture device. In this example, the method tracks a person using a first image capture device, or the person is only visible to the first image capture device. When the person is tracked to the edge of the viewing area of the first image capture device, if the person can now be tracked by a second image capture device, the tracking is done by the second image capture device. The determination of which device or devices will perform the tracking can be done based on evaluation of parameters of interest to the specific application, and/or using a threshold for the parameter of interest. Other implementations and techniques will be obvious to one skilled in the art.

In an optional embodiment, a first facial coefficient template in the first image does not correspond to any facial coefficient template in the second image, so the first facial coefficient template is retained to compare to facial coefficient templates in subsequent images. This first facial coefficient template can be retained for a given amount of time. The specific amount of time will depend on the implementation and specific application of the method. During the time that the person cannot be tracked using facial coefficient templates, the person may be able to be tracked using conventional methods known in the art. Examples of conventional methods include using a known location or position, spatial predication, or matching of distinctive features such as color or texture. If the first facial coefficient vector matches a facial coefficient vector of a subsequent image, tracking of the face can continue from the subsequent image using the known face. Re-acquiring a known face allows tracking to resume using the method of the facial coefficient vector in combination with the other described methods.

It is possible that each of the single methods of tracking a person can lose track of a person. For example, the method of facial coefficient vectors uses an image of at least a portion of the front of the face of a person. If a person walks away from the image capture device, or otherwise turns their face away from the view of the image capture device, the facial coefficient vector method will lose track of the face. The method of spatial prediction uses the location or position of a person in an image to predict where that person will be in a subsequent image. If a person moves erratically, the spatial prediction method will lose track of the person. Using tracking methods in combination facilitates tracking a person in cases where a single method fails.

Figure 5:
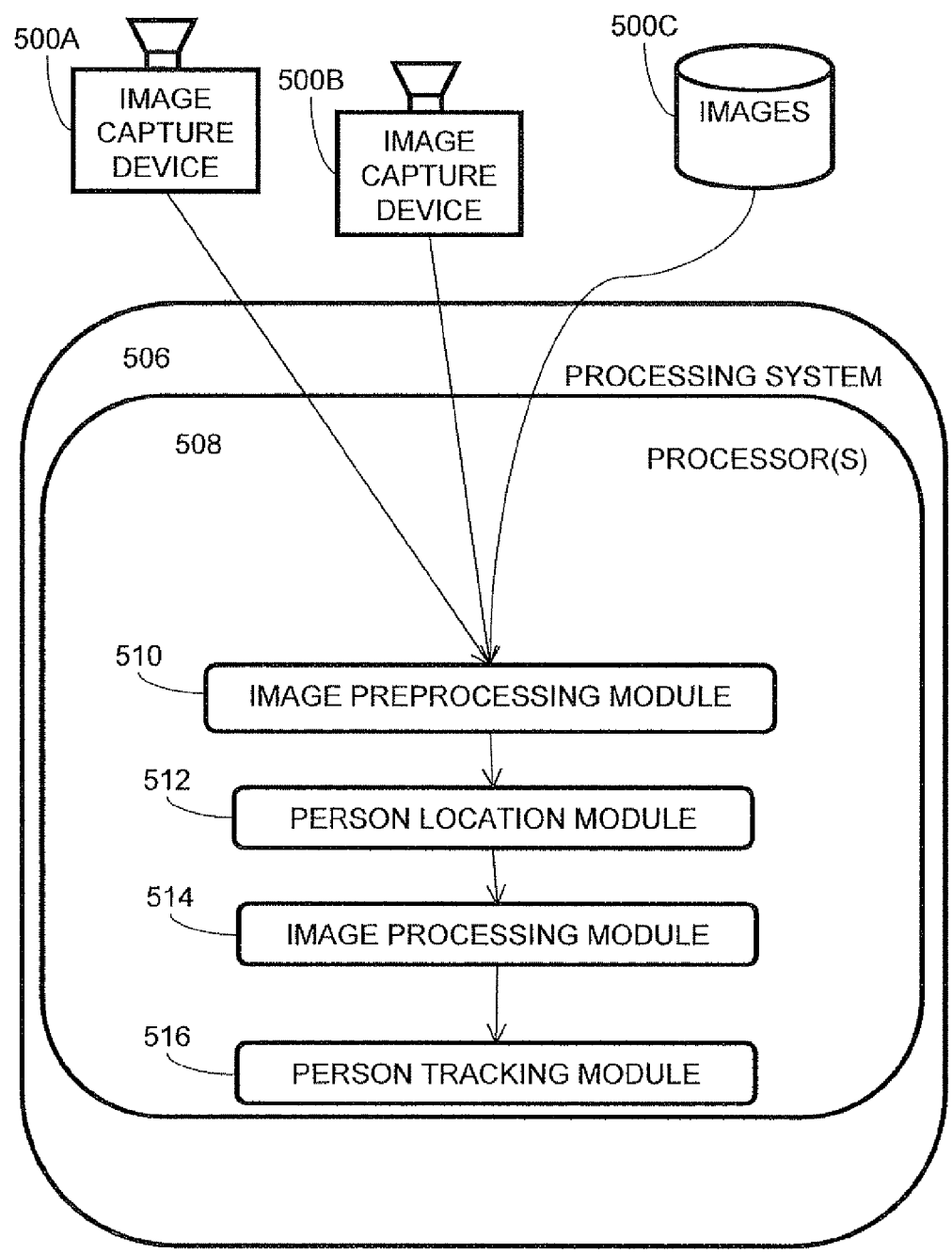
FIG. 5 is a diagram of a system to track people.

Referring now to the drawings, FIG. 5 is a diagram of a system to track people. The system includes one or more image capture devices 500A, 500B, to provide images and a processing system 506. Optionally the images can be provided from storage 500C. The processing system 506 includes one or more processors 508 configured with optional processing modules.

The one or more image capture devices 500A, 500B, are operationally connected to the processing system 506. The image capture devices 500A, 500B, capture images of a real scene in which it is desired to track people. The type of captured image depends on the type of equipment used. Image capture can be done by a variety of devices including color cameras, infrared cameras, and range sensing devices such as Light Detection and Ranging (LIDAR). Optionally the images can be provided from storage 500C, such as a database of previously captured images. In one implementation, a person can be tracked by a first image capture device until the person leaves the view of the first image capture device and enters the view of a second image capture device. The person can then be tracked by the second image capture device. In another implementation, a person may be viewable by more than one image capture device and the system can track the person in both scenes. It will be obvious to one ordinarily skilled in the art that other sources and combinations are possible.

The one or more images are provided to a processing system 506 configured with one or more processors 508. The processors can be configured with a variety of modules. In one embodiment, the processors 508 are configured with an image-preprocessing module 510. Preprocessing includes any processing necessary to convert the provided image into the appropriate input for subsequent processing. An example of preprocessing is to change the data format of the provided image to a data format that can be read by the next module in the system. Another example is more than one image source provides image information, and the preprocessor combines this partial information to generate a sufficient first image. Alternatively, a single image source can provide multiple images and the preprocessor combines these images to generate a sufficient first image. The identification of static information can be implemented in the image-preprocessing module 510, or the image-processing module 514. This information can then be fed back into the system for use in other modules as appropriate. Other options will be obvious to one skilled in the art.

After optional preprocessing 510, the image is processed by the person location module 512. The person location module can include a variety of techniques depending on the specific implementation of the system. Optionally the size of a face in a two-dimensional image can be used to derive the three-dimensional position of the corresponding person. This information can be sent with the image to the optional image-processing module 514. The image-processing module includes any processing necessary to extract areas of the image and prepare those areas for subsequent processing. An example of processing is to extract only the area of the image containing the face of a person. Another example is the need for normalization of faces in a captured image in preparation for facial processing.

After processing 514, the relevant information is sent to the person-tracking module 516. The person-tracking module 516 implements the relevant techniques for tracking a person from an image to a subsequent image. In one implementation, the persons are tracked using a facial coefficient vector, as described elsewhere in this document. To improve the success of tracking, the facial coefficient vector can be used in combination with conventional techniques. One example is to use the facial coefficient vector tracking in combination with predicted spatial distance tracking. Conventional techniques can also be used alone or in combination to improve the success of tracking.

It will be appreciated that the above descriptions are intended only to serve as examples, and that many other embodiments are possible within the scope of the present invention as defined in the appended claims.

What is claimed is:

1. A method to track persons, comprising the steps of:
   (a) generating a first set of facial coefficient vectors by:
      (i) providing a first image containing a plurality of persons;
      (ii) locating faces of persons in said first image; and
      (iii) generating a facial coefficient vector for each said face by extracting from said first image coefficients sufficient to locally identify each said face,
   (b) generating a second set of facial coefficient vectors by:
      (i) providing a second image containing a plurality of persons;
      (ii) locating faces of persons in said second image; and
      (iii) generating a facial coefficient vector for each said face by extracting from said second image coefficients sufficient to locally identify each face, and
   (c) generating a third set of facial coefficient vectors by:
      (i) providing a third image containing a plurality of persons;
      (ii) locating persons in said third image;
      (iii) locating faces of persons in said third image; and
      (iv) generating a facial coefficient vector for each said face by extracting from said third image coefficients sufficient to locally identify each said face,
   (d) determining predicated locations in said third image of each said person from the location of each said person for which a first facial coefficient vector was extracted with the location of each said person for which second facial coefficient vector was extracted;
   (e) determining a vector distance between each said second facial coefficient vector and each said third facial coefficient vector; and
   (f) tracking the persons within said images, said tracking including using said predicated locations in combination with said vector distance between facial coefficient vectors to determine for each face in said second image which is the corresponding face in said third image,
   wherein the number of coefficients in said facial coefficient vectors sufficient to locally identify each said face are in the range of 5 to 200 coefficients.

2. The method of claim 1 wherein the size of said face in said image is used to derive the three-dimensional position of the corresponding person.

3. The method of claim 1 further comprising determining a location of static objects, wherein the location of said static objects is used to facilitate said tracking.

4. The method of claim 1 wherein said first image is from a first image capture device and said second image is from a second image capture device.

5. The method of claim 1 wherein, in a case in which a first facial coefficient template in said first image does not correspond to any facial coefficient template for a face in said second image, said first facial coefficient template is retained for use in said comparing while said tracking is repeated for subsequent images.

6. The method of claim 1 wherein said first and second images derive from a plurality of images that have been processed to generate respectively said first and second images.

7. The method of claim 1 wherein the images are provided from a storage system.

8. The method of claim 1 wherein the location is a two-dimensional location.

9. The method of claim 1 wherein the location is a three-dimensional position.

10. The method of claim 1 wherein said tracking includes comparing the two-dimensional locations of the bodies of persons in said images.

11. The method of claim 1 wherein said tracking includes comparing the three-dimensional positions of the bodies of persons in said images.

12. The method of claim 1 wherein said tracking includes color matching of persons in said images.

13. The method of claim 1 wherein said tracking includes texture matching of persons in said images.

14. The method of claim 1 wherein said tracking includes any method of matching persons in said images.

15. A system to track persons, the system comprising:
   (a) at least one image capture device providing a first image;
   (b) at least one image capture device providing a second image;
   (c) at least one image capture device providing a third image; and
   (d) a processing system including at least one processor, operationally connected to said image capture device, configured to:
      (i) generate from said first image a first set of facial coefficient vectors;
      (ii) generate from said second image a second set of facial coefficient vectors;
      (iii) generate from said third image a third set of facial coefficient vectors;
      (iv) determine predicted locations in said third image of each person from the location of each said person for which a first facial coefficient vector was extracted with the location of each said person for which second facial coefficient vector was extracted;
      (v) determine a vector distance between each said second facial coefficient vector and each said third facial coefficient vector; and
      (vi) track the persons within said images, said tracking including using said predicted locations in combination with said vector distance between facial coefficient vectors to determine for each face in said second image which is the corresponding face in said third image,
   wherein said first, second, and third sets of facial coefficient vectors are generated for each located face by extracting from respective first, second, and third images coefficients sufficient to locally identify each said face, and
   wherein the number of coefficients in said first, second, and third sets of facial coefficient vectors sufficient to locally identify each said face are in the range of 5 to 200 coefficients.

16. The system of claim 15, wherein the size of a face in said image is used to derive the three-dimensional position of the corresponding person.

17. The system of claim 15, further comprising determining a location of static objects, wherein the location of said static objects is used to facilitate said tracking.

18. The system of claim 15, wherein said first image is from a first image capture device and said second image is from a second image capture device.

19. The system of claim 15, wherein in a case in which a first facial coefficient template in said first image does not correspond to any facial coefficient template for a face in said second image, said first facial coefficient template is retained for use in said comparing while said tracking is repeated for subsequent images.

20. The system of claim 15, wherein said first and second images derive from a plurality of images that have been processed to generate respectively said first and second images.

21. The system of claim 15, wherein the images are provided from a storage system.

22. The system of claim 15, wherein the location is a two-dimensional location.

23. The system of claim 15, wherein the location is a three-dimensional position.

24. The system of claim 15, wherein said tracking includes comparing the two-dimensional locations of the bodies of persons in said images.

25. The system of claim 15, wherein said tracking includes comparing the three-dimensional positions of the bodies of persons in said images.

26. The system of claim 15, wherein said tracking includes color matching of persons in said images.

27. The system of claim 15, wherein said tracking includes texture matching of persons in said images.

28. The system of claim 15, wherein said tracking includes any method of matching persons in said images.

* * * * *